US010802878B2

(12) United States Patent
Cicardo et al.

(10) Patent No.: US 10,802,878 B2
(45) Date of Patent: Oct. 13, 2020

(54) PHASED START AND STOP OF RESOURCES IN A MAINFRAME ENVIRONMENT

(71) Applicant: BMC SOFTWARE, INC., Houston, TX (US)

(72) Inventors: Jay Cicardo, Willis, TX (US); Roxanne Kallman, Ham Lake, MN (US)

(73) Assignee: BMC Software, Inc., Houston, TX (US)

(*) Notice: Subject to any disclaimer, the term of this patent is extended or adjusted under 35 U.S.C. 154(b) by 465 days.

(21) Appl. No.: 15/475,830

(22) Filed: Mar. 31, 2017

(65) Prior Publication Data

US 2018/0285150 A1    Oct. 4, 2018

(51) Int. Cl.
*G06F 9/50* (2006.01)
(52) U.S. Cl.
CPC ................... *G06F 9/5011* (2013.01)
(58) Field of Classification Search
None
See application file for complete search history.

(56) References Cited

U.S. PATENT DOCUMENTS

| | | | | |
|---|---|---|---|---|
| 4,980,857 A * | 12/1990 | Walter | ............ | G06F 9/4881 714/45 |
| 5,588,134 A * | 12/1996 | Oneto | ............ | G06F 9/4881 710/244 |
| 6,112,237 A * | 8/2000 | Donaldson | ............ | G06F 11/327 709/223 |
| 6,427,161 B1 * | 7/2002 | LiVecchi | ............ | G06F 9/4881 718/102 |
| 6,560,606 B1 * | 5/2003 | Young | ............ | G06F 9/4881 |
| 6,782,531 B2 * | 8/2004 | Young | ............ | G06F 9/4881 707/999.1 |
| 7,194,737 B2 * | 3/2007 | Amodio | ............ | G06F 8/65 717/169 |
| 7,669,081 B2 * | 2/2010 | Lett | ............ | G06F 9/485 714/15 |

(Continued)

OTHER PUBLICATIONS

Introduction to the New Mainframe Z/OS Basics IBM Mar. 2011 available at <https://www.redbooks.ibm.com/redbooks/pdfs/sg246366.pdf> (Year: 2011).*

(Continued)

*Primary Examiner* — Matthew J Brophy
(74) *Attorney, Agent, or Firm* — Brake Hughes Bellermann LLP (57) ABSTRACT

A method on mainframe computing system includes determining a current phase of an ordered list of phases, the current phase being one of a plurality of phases in the ordered list of phases and setting a target phase based on the current phase, the ordered list of phases, and a parameter phase when the parameter phase is provided. The method also includes using the target phase and a resource assignment structure to start and stop a plurality of resources that run on the mainframe computing system. At least some of the plurality of resources have an assigned phase in the resource assignment structure. The method also includes repeating the determining, setting, and using, responsive to receiving a phase command.

21 Claims, 6 Drawing Sheets

(56) References Cited

U.S. PATENT DOCUMENTS

| | | | | |
|---|---|---|---|---|
| 7,934,216 B2* | 4/2011 | Taylor | ............ | H04L 67/34 709/223 |
| 8,042,107 B2* | 10/2011 | Amodio | ............ | G06F 8/65 717/169 |
| 8,122,106 B2* | 2/2012 | Hunt | ............ | G06F 8/65 703/13 |
| 8,219,998 B2* | 7/2012 | Taylor | ............ | H04L 67/34 709/226 |
| 8,606,749 B1* | 12/2013 | Brown | ............ | G06F 9/5038 707/608 |
| 9,250,981 B2* | 2/2016 | Burgess | ............ | G06F 9/4843 |
| 9,250,982 B2* | 2/2016 | Burgess | ............ | G06F 9/4843 |
| 9,342,355 B2* | 5/2016 | Lin | ............ | G06F 9/5066 |
| 9,477,529 B2* | 10/2016 | Chen | ............ | G06F 9/505 |
| 9,641,394 B2* | 5/2017 | Jubran | ............ | H04L 41/12 |
| 9,804,888 B2* | 10/2017 | Marathe | ............ | G06F 9/4881 |
| 9,965,330 B2* | 5/2018 | Bishop | ............ | G06F 9/505 |
| 10,025,625 B2* | 7/2018 | Thiruvengadachari | ............ | G06F 9/4881 |
| 10,031,774 B2* | 7/2018 | Chen | ............ | G06F 9/4881 |
| 10,108,452 B2* | 10/2018 | Chen | ............ | G06F 9/4881 |
| 10,268,509 B2* | 4/2019 | Chen | ............ | G06F 9/4881 |
| 10,275,277 B2* | 4/2019 | Chen | ............ | G06F 9/5044 |
| 10,452,371 B2* | 10/2019 | Bland | ............ | G06F 8/60 |
| 2002/0198888 A1* | 12/2002 | Young | ............ | G06F 9/4881 |
| 2003/0149717 A1* | 8/2003 | Heinzman | ............ | G06F 9/505 718/101 |
| 2004/0068722 A1* | 4/2004 | Amodio | ............ | H04L 69/329 717/169 |
| 2005/0268295 A1* | 12/2005 | Amodio | ............ | H04L 67/34 717/168 |
| 2007/0078858 A1* | 4/2007 | Taylor | ............ | H04L 67/34 |
| 2007/0094662 A1* | 4/2007 | Berstis | ............ | G06F 9/505 718/102 |
| 2008/0120620 A1* | 5/2008 | Lett | ............ | G06F 9/485 718/103 |
| 2008/0222647 A1* | 9/2008 | Taylor | ............ | H04L 67/34 718/105 |
| 2009/0320032 A1* | 12/2009 | Avni | ............ | G06F 9/5083 718/103 |
| 2010/0005472 A1* | 1/2010 | Krishnaraj | ............ | G06F 9/5044 718/104 |
| 2011/0099552 A1* | 4/2011 | Avni | ............ | G06F 9/4881 718/103 |
| 2011/0185165 A1* | 7/2011 | Haga | ............ | G06F 21/57 713/2 |
| 2012/0180069 A1* | 7/2012 | Katnic | ............ | G06Q 10/10 718/106 |
| 2012/0210337 A1* | 8/2012 | Cardona | ............ | H04L 61/2015 719/321 |
| 2013/0067495 A1* | 3/2013 | Singh | ............ | G06F 9/485 719/318 |
| 2013/0198346 A1* | 8/2013 | Jubran | ............ | H04L 41/12 709/220 |
| 2013/0268947 A1* | 10/2013 | Burgess | ............ | G06F 9/4843 719/315 |
| 2013/0346993 A1* | 12/2013 | Chen | ............ | G06F 9/5044 718/103 |
| 2014/0282574 A1* | 9/2014 | Marathe | ............ | G06F 9/4881 718/103 |
| 2014/0344813 A1* | 11/2014 | Jamjoom | ............ | G06F 9/4881 718/101 |
| 2014/0344814 A1* | 11/2014 | Jamjoom | ............ | G06F 9/50 718/101 |
| 2015/0007200 A1* | 1/2015 | Burgess | ............ | G06F 16/2455 719/315 |
| 2015/0058864 A1* | 2/2015 | Bourbonnais | ............ | G06F 9/4856 718/105 |
| 2015/0095472 A1* | 4/2015 | Cardona | ............ | G06F 9/505 709/221 |
| 2015/0199208 A1* | 7/2015 | Huang | ............ | G06F 9/44505 718/1 |
| 2015/0261580 A1* | 9/2015 | Shau | ............ | H04L 67/42 718/106 |
| 2015/0264119 A1* | 9/2015 | Shau | ............ | H04L 67/42 709/203 |
| 2015/0264122 A1* | 9/2015 | Shau | ............ | G06F 9/4881 709/203 |
| 2015/0339467 A1* | 11/2015 | Morita | ............ | G06F 21/6218 726/1 |
| 2016/0034318 A1* | 2/2016 | Byreddy | ............ | G06F 9/5072 718/105 |
| 2016/0378561 A1* | 12/2016 | Chen | ............ | G06F 9/4881 718/103 |
| 2016/0378562 A1* | 12/2016 | Chen | ............ | G06F 9/5044 718/103 |
| 2016/0378572 A1* | 12/2016 | Hom | ............ | G06F 16/2365 718/101 |
| 2017/0004009 A1* | 1/2017 | Chen | ............ | H04L 67/1002 |
| 2017/0046102 A1* | 2/2017 | He | ............ | G06F 9/4881 |
| 2017/0109199 A1* | 4/2017 | Chen | ............ | G06F 9/5027 |
| 2017/0139749 A1* | 5/2017 | Jamjoom | ............ | G06F 9/505 |
| 2017/0364390 A1* | 12/2017 | Bland | ............ | G06F 8/60 |
| 2018/0173561 A1* | 6/2018 | Moroski | ............ | G06F 9/4843 |
| 2018/0232255 A1* | 8/2018 | Nordin | ............ | G06F 9/45558 |
| 2018/0314557 A9* | 11/2018 | Hom | ............ | G06F 16/2365 |
| 2019/0042309 A1* | 2/2019 | Chen | ............ | G06F 9/505 |

OTHER PUBLICATIONS

Ferstl, Fritz. "Job-and resource-management systems in heterogeneous clusters." Future Generation Computer Systems 12.1 (1996): 39-51. (Year: 1996).*

"MainView Total Object Manager User Guide: Chapter 8", Version 8.1 MainView Total Object Manager, BMC Software, Inc., Dec. 2016, 23 pages.

* cited by examiner

FIG. 1

| Phase | Resource |
|---|---|
| MINIMAL | JES2 |
| MINIMAL | TSO |
| MINIMAL | TCPIP |
| DATABASE | DB2MSTR |
| DATABASE | IMS1 |
| DATABASE | CICS1 |
| RESERVATION | FILESRVR |
| RESERVATION | SCHEDULER |
| RESERVATION | NETCOM |
| CHECKIN | PAYROLL |
| CHECKIN | PASSENGERUI |
|  | MESSAGES |

PHASED START AND STOP OF RESOURCES IN A MAINFRAME ENVIRONMENT

BACKGROUND

Mainframe computers are large, multi-processor computing devices able to perform thousands of tasks every second. Many mainframe computers have an operating system that enables a mixed workload environment that supports the simultaneous execution of many types of workloads. Some of these workloads, called subsystems, are long-running servers that perform specific tasks and act as a layer between the operating system and end-user applications. This subsystem layer includes workloads that support job entry, transaction processing, database management, security management, network management, etc. These subsystems are vehicles through which end-user applications process their workloads, so the subsystems must always be present (up and running). An example of an end-user application is an airline ticketing reservation system which relies on a specific database management subsystem, like DB2, being up and running. For the purpose of this disclosure, a resource is a subsystem, end-user application, and any associated hardware, software and/or data.

Today, in the majority of large data centers, which include one or more mainframe computer systems, automation plays an important role in ensuring that business-critical applications and required subsystems, hardware and/or data are available at the time needed. When a mainframe system starts, the operating system and the other resources are started with an initial program load (IPL) command. Due to complexities in managing which resources start when, an automation system may include a state manager, which controls and manages the state (started or stopped) of resources during an IPL, execution, and shutdown. The state manager uses user-defined policies based on business needs and best practices to start, stop, and change the status of the resources. A system administrator defines the automation policies for the state manager.

SUMMARY

Systems and methods provide flexibility to the management of resources by adding phases to the state manager of a mainframe computing system. Adding phases enables a system administrator to perform maintenance tasks and system verification checks as part of an IPL process that are not possible without phases. Phases also enable a system administrator to safely shut down resources for debugging and error resolution without having to take all resources offline and without introducing unintended system outages. Implementations associate resources with phases and specify an order for the phases. Implementations create a pause between phases, so a system administrator can perform maintenance functions without manually stopping and starting resources, which can introduce unintended consequences, and sometimes cause additional system outages, due to complex dependencies. Implementations also enable a system administrator to perform maintenance tasks more efficiently, which increases system availability and improves end-user experiences.

According to one aspect, a mainframe computing system includes at least one processor, a state manager configured to manage a plurality of resources that run on the mainframe computing system, and a phase manager that operates with the state manager to automatically start and stop the plurality of resources in phases according to an ordered list of phases. At least some of the plurality of resources are assigned to one of a plurality of phases in the ordered list of phases.

According to one aspect, a method for starting and stopping mainframe resources in phases includes determining a current phase of an ordered list of phases, the current phase being one of a plurality of phases in the ordered list of phases, setting a target phase based on the current phase, the ordered list of phases, and a parameter phase when the parameter phase is provided, and using the target phase and a resource assignment structure to start and stop a plurality of resources that run on a mainframe computing system, at least some of the plurality of resources having an assigned phase in the resource assignment structure. The method includes repeating the determining, setting, and using, responsive to receiving a phase command.

According to one aspect, a method includes receiving, at a mainframe computing system, an initial program load command and starting a state manager responsive to the initial program load command. The state manager manages a plurality of resources running on the mainframe computing system. The method also includes setting a target phase to a first phase identified in an ordered list of phases and starting resources assigned to the target phase in a resource phase assignment structure in accordance with a policy for the state manager. The resource phase assignment structure identifies at least some of the plurality of resources. The method also includes waiting for a phase command before starting resources not assigned to the target phase.

According to one aspect, a method includes receiving, at a mainframe computing system, an initial program load command and starting a state manager responsive to the initial program load command. The state manager manages a plurality of resources running on the mainframe computing system. The method may also include determining an assignment of the plurality of resources to phases in an ordered list of phases, starting the plurality resources by phase in the phase order, wherein each phase starts responsive to a phase start command, receiving a stop phase command identifying a parameter phase, and stopping resources assigned to phases occurring later in the ordered list.

According to one aspect, a method includes determining, responsive to receipt of an operator start phase command, a current phase and determining that the start phase command includes a parameter phase. The method also includes setting a target phase to the parameter phase responsive to determining the parameter phase is less than or equal to a next phase, the next phase succeeding the current phase in an ordered list of phases. The method also includes using the target phase and resource phase assignments to start and stop a plurality of resources managed by a state manager policy.

According to one aspect a computer-readable medium has recorded and embodied thereon instructions that, when executed by a processor of a computer system, cause the computer system to perform any of the methods and processes disclosed herein.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

State managers conventionally manage all resources to the defined policies whether it is starting, stopping, or changing the status of the resources. This means responsive to an IPL the state manager attempts to start all resources in accordance with the policy. Likewise, on a system shutdown, the state manager stops all resources. This all-or-nothing behavior of a conventional state manager results in problematic and complicated maintenance and problem resolution scenarios, especially as the number of resources managed by the state manager increases. Implementations provide for a phased start of the resources within a single state manager. This enhances the functioning of a mainframe by reducing downtime due to decreased complexity in applying upgrades and solving system errors. A phased start of resources provide a system operator the opportunity to verify that resources in earlier phases are operational before continuing to start resources, to apply maintenance patches to resources without having to start all resources and then manually determining which resources to stop and stopping those resources. Additional phased stopping of resources enables the system operator to keep resources running when a problem is discovered in starting a phase, which decreases system outage time.

Figure 1:
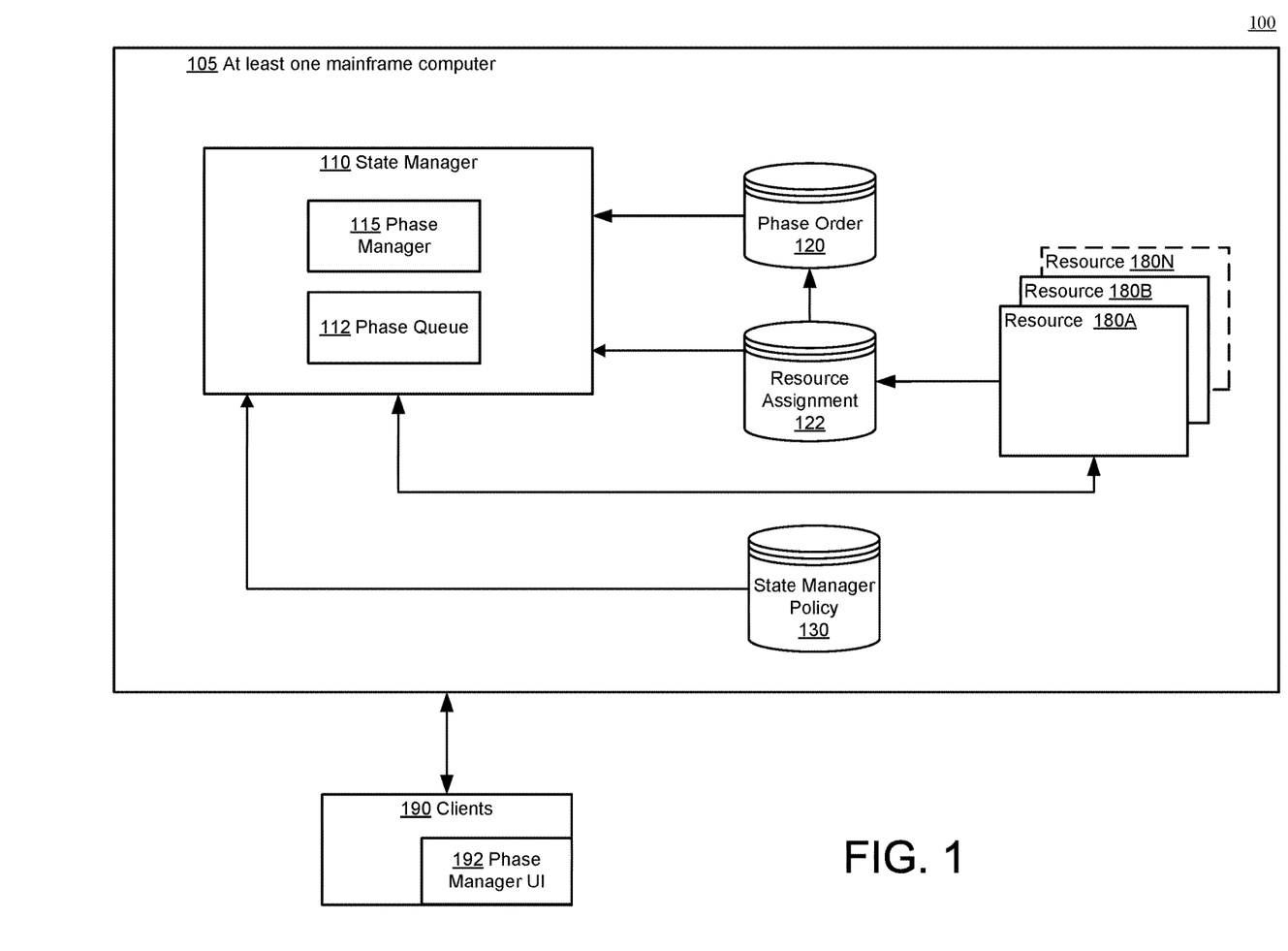
FIG. 1 is a block diagram that illustrates a mainframe with a phased state manager, according to an implementation.

FIG. 1 is a schematic diagram that illustrates an example phased-enhanced state manager system. The phased-enhanced state manager system can be embodied, for example, on one or more mainframe computing devices. The phased-enhanced state manager system 100 can include, for example, one or more mainframe computing devices 105, and one or more clients 190. Mainframe computing device 105 may be, for example an IBM zSeries® mainframe computer. (zSeries is a registered trademark of the IBM Corporation) or another mainframe or similar computing device where multiple subsystems and customer applications are executed. Because of their large size and processing power, mainframe owners often contract out use of processing time on a mainframe to one or more customers.

In some implementations, different customers may be responsible for different partitions of a single physical computing device. These partitions can be referred to as logical partitions, or LPARs. An LPAR is a logical segmentation of a mainframe's memory and other resources that allows the LPAR to run its own copy of an operating system and associated applications, making the LPAR, in practice, equivalent to a separate mainframe. LPARs may be enabled via special hardware circuits or purely through software. A system administrator can assign one or more processors for the exclusive use of an LPAR. Alternately, the administrator can allow all processors to be used on some or all LPARs. LPARs may also allow multiple system images (of the same operating system or different operating systems) to run in one machine. Furthermore, each LPAR can execute one or more subsystems within an operating system. In some implementations, computing device 105 may represent one or more SYSPLEXes. A SYSPLEX is a collection of LPARs that cooperate to process work. The LPARs in a SYSPLEX may communicate with a specialized communications component (e.g., XCF). The LPARs in a SYSPLEX need not be located on the same physical device.

In some implementations, mainframe computing device 105 may represent multiple distributed mainframe computers. For example, the system 100 may include multiple mainframe computers in communication with each other via one or more networks (not shown in FIG. 1).

The mainframe computing device 105 can include one or more processors (CPUs) or banks of processors capable of executing one or more machine executable instructions or pieces of software, firmware, or a combination thereof. The processors in a mainframe may include a plurality of processors. The plurality of processors may be managed as one or more central processor complexes. A central processor complex includes physical CPU hardware that is managed as a group. The computing device 105 may also include one or more computer readable storage devices, such as main memory, cache, or disk storage, configured to store data and/or applications, either temporarily, permanently, semi-permanently, or a combination thereof. The storage devices may include volatile memory, non-volatile memory, or a combination thereof.

The mainframe computing device 105 includes an operating system. The operating system can be the z/OS operating system or some other mainframe operating system. The mainframe computing device 105 may include a state manager 110. The state manager 110 is a subsystem executing on the mainframe computing device 105 that automates and controls the management of system resources 180, e.g. resource 180A, resource 180B, . . . , resource 180N, where N is any positive integer. A resource 180 may be a subsystem. A subsystem is a long-running server, facility, or application that supports other types of workload. For example, a database management system, such as DB2, IMS, etc., is a type of subsystem. As another example, security facilities, such as Resource Access Control Facility (RACF), are a type of subsystem. As another example, a subsystem may control transaction processing, such as Customer Information Control System (CICS). There are many other known examples of subsystems. These subsystems are an example of resources 180. Some subsystems may have dependencies on other resources. For example, CICS is commonly dependent on one or more database subsystems. Thus, for CICS to be active the database subsystem must also be active.

In addition to subsystems, resources 180 may be customer applications. Customer applications can be any software or hardware that supports specific functionality for a customer. These customer applications may be written specifically for the customer, or may be sold by vendors to support the customer. The customer applications generally rely on one or more of the subsystems executing on the mainframe computing device 105. The state of a resource in resources 180 may be active, i.e., running or executing, or inactive, i.e., stopped.

The goal of the state manager 110 involves always keeping a resource in its desired state, as specified by the state manager policy 130. When the current state differs from the desired state, the state manager 110 dispatches an action to restore the resource to its proper state. The state manager policy 130 is a set of rules set up by a system administrator. Some of the rules in the state manager policy 130 identify the resources managed by the state manager 110. Some of the rules in the state manager policy 130 specify a schedule for one of the resources. The schedule identifies times, e.g., time of day and/or day of week, that the resource is approved for an active state. For example, a payroll application, which is a type of customer application, may be approved for an active state on weekdays but not weekends. Such rules can be used to reduce the processing cycles of the mainframe that the customer is responsible for by preventing applications that do not need to run from running. Some processing rules may identify dependencies between resources. For example, the payroll resource may need the database system resource and the transaction system resource to be active before the payroll resource can be active. In some implementations, resources may depend on other resources that execute on a different system (e.g., different LPAR). The number of resources managed by the state manager 110 may be large, typically 100 to 500 resources or more.

The mainframe computing system 105 may include a phase manager 115 to control some of the behavior of the state manager 110. The phase manager 115 allows state management actions to be performed in phases. A phase is a period during which various state management actions are performed to prepare the mainframe environment and ensure that all resources 180 needed are ready for customer applications to do what they need to do. A phase can be a start-up of a subset of resources. A phase can be a shutdown of a subset of resources. Each phase may be defined by the resources assigned to it in a resource assignment structure 122. The phase manager 115 does not proceed to a next phase until specifically instructed to do so, e.g., by an operator. Thus, the mainframe computer 105 may wait for a next phase command before starting the resources associated with the next phase. The command may be provided after a phase has finished or can be provided before a phase is finished. For example, if the phase manager 115 is currently starting resources associated with a second phase the operator may provide a start phase command during the second phase. This command may be placed in the phase queue 112 until the phase manager 115 completes the second phase. When the second phase is complete the phase manager may pick the start phase command up from the phase queue 112 and begin the third phase. Thus, the wait time before starting the third phase may be unnoticeable by a human operator. Alternatively, the operator may wish to verify that the resources associated with the second phase are running correctly before starting the third phase. In this case the operator does not issue the start phase command during the second phase. Thus the wait time between the completion of the second phase and the start of the third phase may be several minutes, or whatever time is needed by the operator to perform the verification. In some implementations the start phase command may specify a phase as a parameter. This may be interpreted by the state manager 110 as a command to start all phases up to and including the parameter phase. Thus the phase queue 112 is a memory holding area for any start or stop phase commands issued by the operator while the phase manager 115 is completing a phase.

Figure 2:
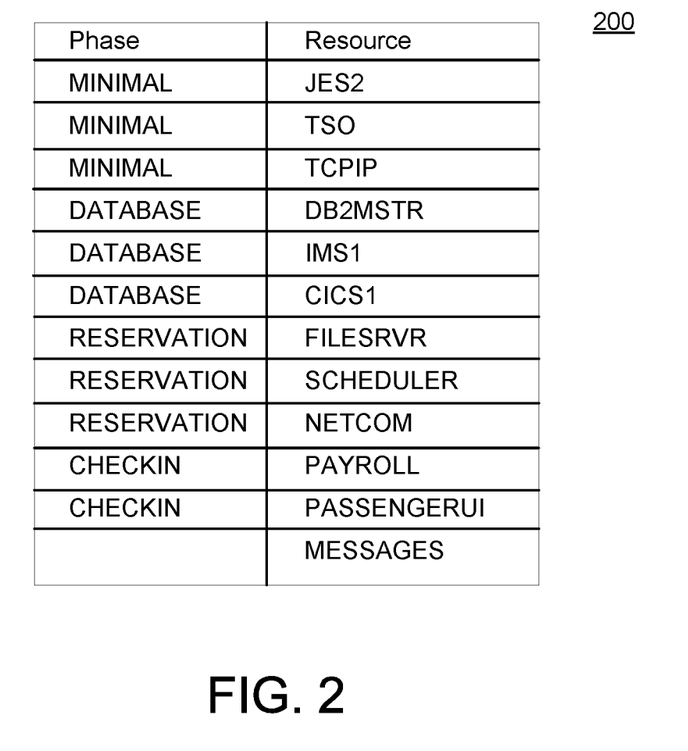
FIG. 2 is an example of a resource assignment structure, according to an implementation.

The resource assignment structure 122 assigns resources to phases. The resource assignment structure 122 can be a table structure that associates a resource with a phase. The resource assignment structure can also be represented as attributes of the resource. The resource assignment structure may also be represented as a linked list of resources for each phase. Any structure that associates the resources 180 with one of the phases may be the resource assignment structure 122. FIG. 2 is one example 200 of a resource assignment structure 122.

In some implementations, not every resource in resources 180 is associated with a phase. If a resource in resources 180 is not specifically associated with a phase in the resource assignment structure 122, it may be associated with a default phase, or NULL phase. The NULL phase is a default phase that occurs last, i.e., is the last phase to start on a load and the first phase to stop in a shutdown. The NULL phase can be empty, i.e., not associated with any resources. The NULL phase includes any resources that the administrator chooses not to specifically associate with a phase. Thus, for example, the administrator may be able to assign a few of the hundreds of resources managed by the state manager to phases and leave the remaining resources managed by the state manager to default to the NULL phase.

The phase manager 115 may also have access to a phase order 120. The phase order 120 specifies the order that the administrator wants the phases to start up in. The phase order 120 is an ordered list of the phases identified in the resource assignment structure 122. Thus, the first phase to run responsive to an IPL is first in the ordered list. The NULL phase, although not specified in the ordered list, is the last phase to run responsive to an IPL. Phases that start first are considered earlier in the ordered list. In some implementations the phases may be associated with ordinal numbers to make phase comparisons easier. Thus, reference to a phase may be considered reference to an ordinal assigned to the phase. If the ordinal numbers start with one (1) as the earliest phase in the ordered list, reference to a first phase being less than a second phase is reference to the assigned ordinals, or in other words a determination of whether the first phase occurs earlier in the ordered list than the second phase. Although for ease of discussion, the first phase in the ordered list is referred to as being less than later phases, it is understood that implementations are not limited to this particular ordering. In other words, implementations may assign a higher number to the first phase with the determinations adjusted accordingly. In such an implementation an earlier phase may have a higher ordinal.

In some implementations, system 100 may include one or more clients 190. Clients 190 may include a display or monitor, a keyboard, a touchscreen, a camera, a mouse, a touchpad, a trackpad, a video processor, etc., through which an operator or administrator may send data to and receive data from mainframe computing device 105. For example, client 190 may be a desktop computer, a laptop computer, a tablet computer, etc., running a phase manager UI 192 that communicates with the phase manager 115. Thus, a customer or other user may provide or populate the resource assignment structure 122, provide the phase order 120, monitor the results of a phase, provide phase start and phase stop commands, etc. The client 190 may also use other interfaces, which are not included in the scope of this disclosure, to interact with mainframe computing device 105. It is understood that client 190 may communicate with the at least one mainframe computing device 105 via a variety of networks (not shown), whether local (e.g., LAN) or distributed (e.g., the Internet).

In some implementations, computing device 105 may include one or more other hardware components not shown in FIG. 1. For example, the computing device 105 may include a channel unit for processing Input/Output (I/O) requests, a connection to another mainframe (which may be a network interface or some other communication link such as a communication bus), a tape storage unit, a telecommunications link and a disk storage device sometimes referred to as a Direct Access Storage Device (DASD). Although discussed above as using an IBM zSeries® mainframe, implementations of the system 100 are not so limited as the concepts disclosed herein can be applied to other mainframe computing environments.

Figure 3:
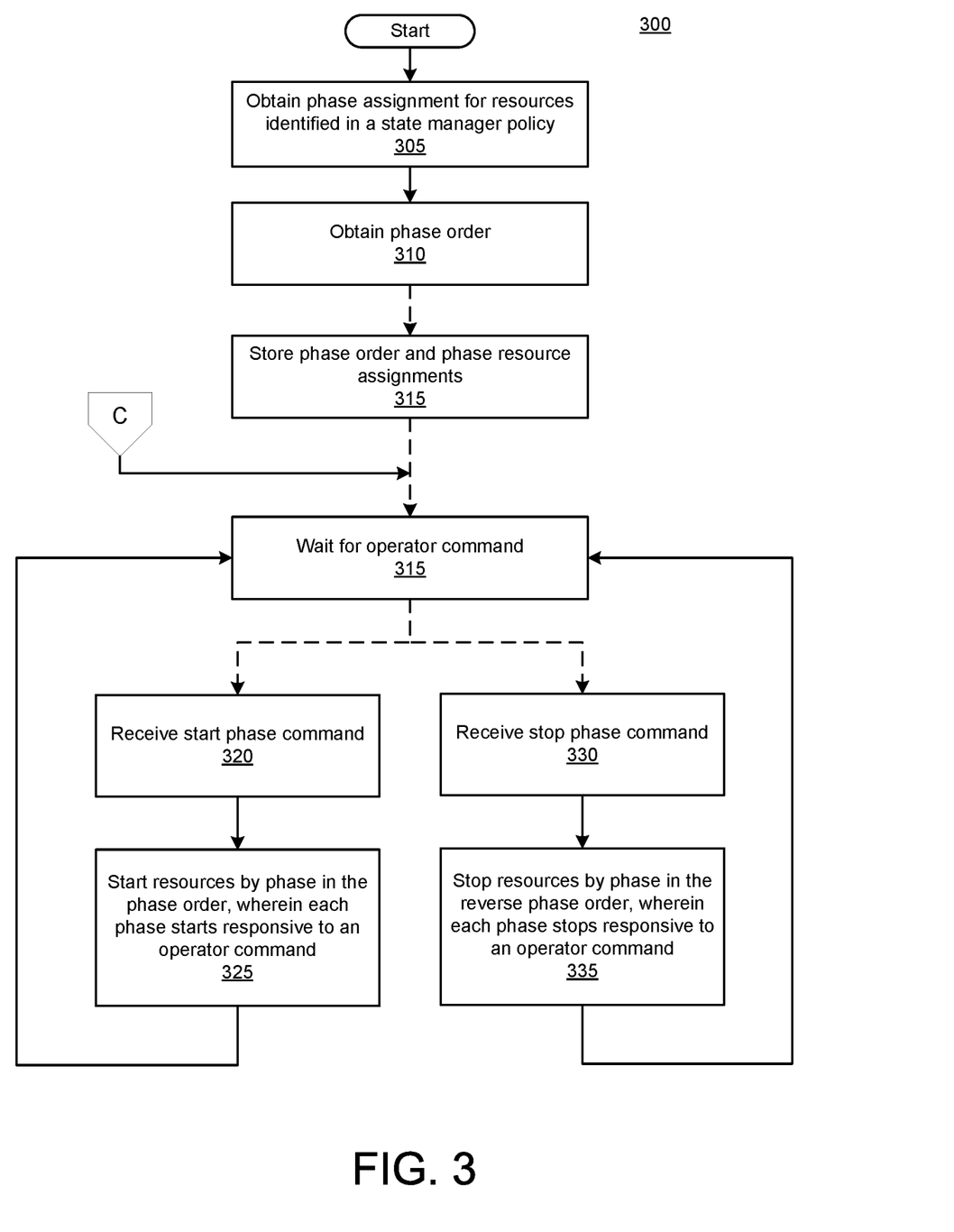
FIG. 3 is a flowchart illustrating an example process for configuring and using a phased state manager, according to an implementation.

FIG. 3 is a flowchart illustrating an example process 300 for configuring and using a phased state manager, according to an implementation. Process 300 enables a mainframe computing system to manage the initialization and shutdown of resources in user-defined and controlled phases. Process 300 may execute on a system such as system 100 of FIG. 1. It is understood that a mainframe computing system may have more than one state manager operational on the mainframe. In such a scenario, process 300 may be executed once for each state manager.

Process 300 may begin with receiving phase assignments for resources identified in a state manager policy (305). The assignments are obtained from a user, e.g., a system operator or administrator. The assignments may assign all resources identified in the state manager policy to a phase. The assignments may also assign less than all resources identified in the state manager policy to a phase. Any resource not assigned to a phase by the user is assigned to a default or NULL phase. The NULL phase is the last or latest-running phase in an ordered list of the phases. If all resources identified in the state manager policy are assigned to a phase the NULL phase has no resources. The system may also obtain a phase order (310) from the user. The phase order specifies, for each phase in the assignment of resources to phases, the order in which the phases run on start-up. In some implementations, the phase order may be provided in an ordered list, with a first listed phase being the first phase to start-up and the last listed phase being the last phase to start-up. In some implementations, the phase order may be defined by the user via assignment to an ordinal number. The system stores the phase order and phase resource assignments in memory (315). The phase resource assignments may be stored in a resource assignment structure. FIG. 2 is one example of a resource assignment structure, although other structures are possible. The phase order may be stored as an ordered list, a linked list, etc. Steps 305 to 315 are an initial setup process that occurs before the state manager can use the phases. Once setup, steps 305 to 315 need not execute again unless a change to the resources or phase order is received from the user. In this sense, steps 305 to 315 execute independently of the remaining steps of process 300.

Once the system has performed setup, the system may wait for an operator command (315). The operator command is a start command (320) or a stop command (330). A start command (320) may be a command automatically issued by the state manager in response to an IPL command. A start command (320) may be a start phase command. A start phase command is an indication from the operator that the system should start the resources in the next phase. The start phase command may lack a parameter phase. In this case, the system may start the next phase in the phase order. The start phase command may include a parameter phase. In this case, the system may interpret this start command as multiple start commands, one for each phase between the next phase and the parameter phase. Thus, for example, if the system just finished a first phase and the start phase command specifies a parameter phase that is fourth in the ordered list of phases, the system may interpret the start phase command as a start command for the second phase, for the third phase, and for the fourth phase. In this manner, the system allows the operator flexibility to start several phases at once. The system then starts the resources identified in the state manager policy by phase in phase order, each phase starting responsive to an operator command (325). The operator commands can be express or implied, e.g., if a parameter phase is used the phases between the current phase and the parameter phase have an implied start phase command. The process of starting resources by phase is described in more detail with regard to FIG. 4.

The operator command may also be a stop command (330). The stop phase command enables an operator to stop resources in the reverse order of the ordered list of phases provided by the operator. In other words, the system starts resources in the phase order and inactivates resources in the reverse phase order. Like the start phase command, the stop phase command may lack a parameter phase. If no parameter phase is provided with the stop phase command, the next earlier phase is stopped. The stop phase may also specify a parameter phase. In this case the stop phase command may be interpreted as receipt of a stop phase command for every phase between the current phase and the parameter phase (in reverse phase order). The system may then start inactivating the resources by phase in the reverse phase order, each phase commencing responsive to an operator command (335). The operator commands can be express or implied, e.g., if a parameter phase is used the phases between the current phase and the parameter phase have an implied stop phase command. The process of stopping resources by phase is described in more detail with regard to FIG. 5.

The system can receive a start or stop phase command at any time during step 325. Using the example ordered list of FIG. 2, if the operator has provided start phase commands up to the RESERVATION phase, but then discovers a problem in the RESERVATION phase that requires maintenance in the DATABASE phase, the operator may provide a stop DATABASE phase command, which inactivates all resources assigned to the DATABASE, RESERVATION, CHECKIN, and NULL phases. Thus, the stop DATABASE phase command can be received prior to a start CHECKIN command, eliminating the need for the operator to figure out which resources to inactivate manually, which decreases system outage time. Process 300 may be a background process that listens for an operator command. In some implementations, step 335 may be executed as a system shutdown process.

Figure 4:
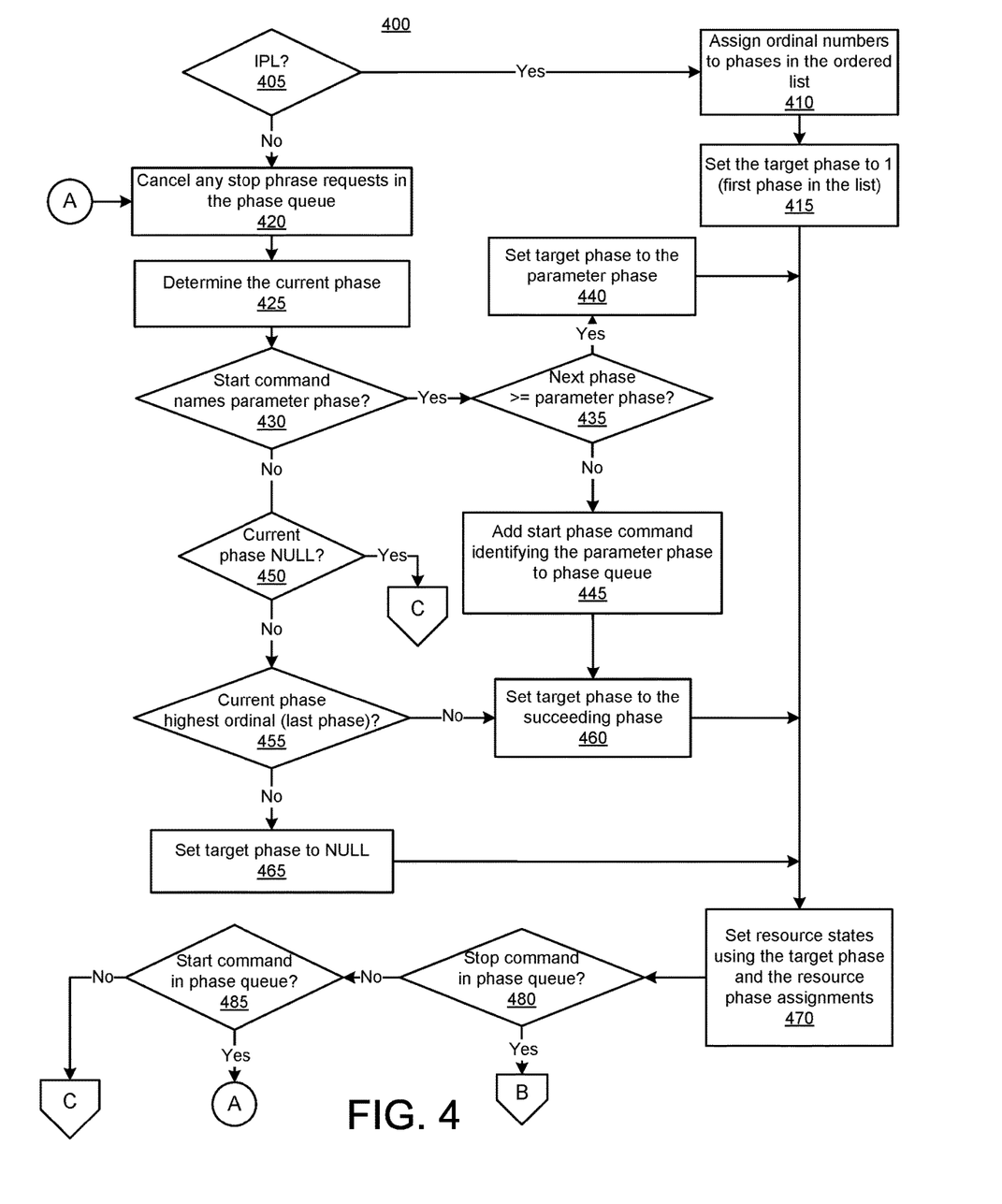
FIG. 4 is a flowchart illustrating an example process for starting resources using phases, according to an implementation.

FIG. 4 is a flowchart illustrating an example process for starting resources using phases, according to an implementation. Process 400 starts phases in phase order, one phase at a time, and waiting for an operator command, between phases. Process 400 may execute as part of step 325 of FIG. 3. Process 400 may begin by determining whether the start command was issued in response to an initial program load (IPL) or not (405). Responsive to an IPL command, the system may, among other things, read the ordered list and, if not already assigned numbers, may assign ordinal numbers to the phases in the ordered list of phases (410). In the example of FIG. 4, the ordinal numbers are increasing, with the first phase in the ordered list receiving a lowest ordinal number. Thus, the system assigns the target phase to one (1), which is the first phase or earliest phase in the ordered list. The system manages the resource to the target phase. Thus, the target phase represents the desired state of resources after the phase command. In other words, after starting or stopping resources, the resources associated with the target phase or any phase that occurs earlier in the phase order than the target phase should be active, in accordance with the start manager policy (e.g., subject to resource dependencies and other policy considerations) and resources assigned to later phases should be inactive. Although the example of FIG. 4 uses ascending order of ordinal numbers, in other implementations the ordinal numbers can be reversed, with appropriate changes to the process 400, e.g., assigning the highest ordinal to the target phase, and similar changes to other steps, such as steps 435, 455, etc. to conform with the reverse ordering. In some implementations, the system may not use ordinal numbering. In such implementations, comparisons such as "less than" are interpreted as earlier in the ordered list than and setting the target phase to the lowest ordinal is setting the target phase to the earliest phase in the ordered list.

If the start command is not responsive to an IPL (405, No), the system may cancel any stop phase requests in the phase queue (420). The phase queue holds start phase and stop phase commands issued by the operator but not yet processed. The system may allow an operator to enter a start or stop phase while a phase is being processed. Such commands are queued in a first-come-first-served basis, although a stop command received after a series of start commands will go ahead of the start commands, as discussed below with regard to step 480. Similarly, if the operator has issued several stop commands and then issued a start command, the start command will be processed next and the system deletes or disregards any stop commands in the queue. The system then determines the current phase (425). For example, the system may read the current phase from memory. As another example, the system may calculate the current phase by determining which resources are active and which are inactive. The current phase represents the latest phase (including the NULL phase) for which resources are active. The system then sets the target phase based on the current phase, the ordered list of phases and the parameter phase, if provided.

The system determines whether the start phase command includes a parameter phase (430). If a parameter phase is provided (430, Yes), the system determines whether the parameter phase is less than the next phase (435). The next phase is the phase that succeeds the current phase in the ordered list. In other words, the next phase is the next higher ordinal than the current phase. If the next phase is greater than or equal to the parameter phase (435, Yes), the system sets the target phase to the parameter phase (440). If the parameter phase is greater than the next phase, the system adds a start phase command that identifies the phase to the phase queue (445) and sets the target phase to the next phase in the ordered list (460). In other words, the system interprets the start phase command that names a later phase as a start phase command for each phase that occurs after the current phase up to the parameter phase, inclusive. As the system has not yet started the phases that precede the parameter phase, the system will automatically start each phase after the current phase up to and including the parameter phase. Thus, the system starts the next phase after the current phase.

If the start command does not identify a parameter phase (430, No), the system may determine whether the current phase is the NULL or default phase (450). If so, the system has no more phases to start and may go into a wait mode, waiting for a next command. The next command may be a start phase that identifies a parameter phase or a stop phase command. If a start phase command, the system will inactivate resources that are associated with phases that occur after the parameter phase in the ordered list. If the current phase is not NULL (450, No), the system may determine whether the current phase is the last phase in the ordered list (455). If the current phase is the last phase, the system may set the target phase to NULL, or the default phase (465). If the current phase is not the last phase (455, Yes), the system sets the target phase to the succeeding, or next highest, phase (460).

Once the target phase is set, based on the current phase, the ordered list of phases, and the parameter phase, if provided, the system attempts to set the state of the resources based on the resource phase assignments, the target phase, and the state manager policy (470). As discussed, each resource may have an active/running state or an inactive/stopped state. In general, resources assigned to a phase that is the target phase or a phase that precedes the target phase should have an active state and the remaining resources should have an inactive state. However, in some cases the state manager resource policy may indicate a resource should be inactive based on the day-of-week and/or the time-of-day. This policy will override the general rule. In addition, the state manager policy may identify a resource in an earlier phase as dependent on a resource in a later phase. Should this occur, the resource will not be made active until the later phase. Thus, setting the resource states in accordance with the state manager policy does not always result in states assigned to earlier phases being active. Similarly, one or more resources may encounter a problem and fail to start. The system sets the resource states in accordance with the state manager policy and subject to system errors. The process of setting resource states is described in more detail with regard to FIG. 6.

Once the system sets the resource states, the system may determine whether the operator has provided a next command by checking the phase queue. If the phase queue includes a stop phase command anywhere in the phase queue (480, Yes) the system initiates the stop phase process, described in more detail with regard to FIG. 5. The operator may have provided the stop phase command while the system was attempting to set the resource states. If the phase queue lacks a stop phase command (480, No), the system determines if there is a start phase command in the phase queue (485). If there is a start phase command (485, Yes), the system repeats process 400 using the next start phase command in the phase queue, e.g., at step 420. Otherwise (485, No), the system waits for another command from the operator (e.g., step 315 of FIG. 3).

Figure 5:
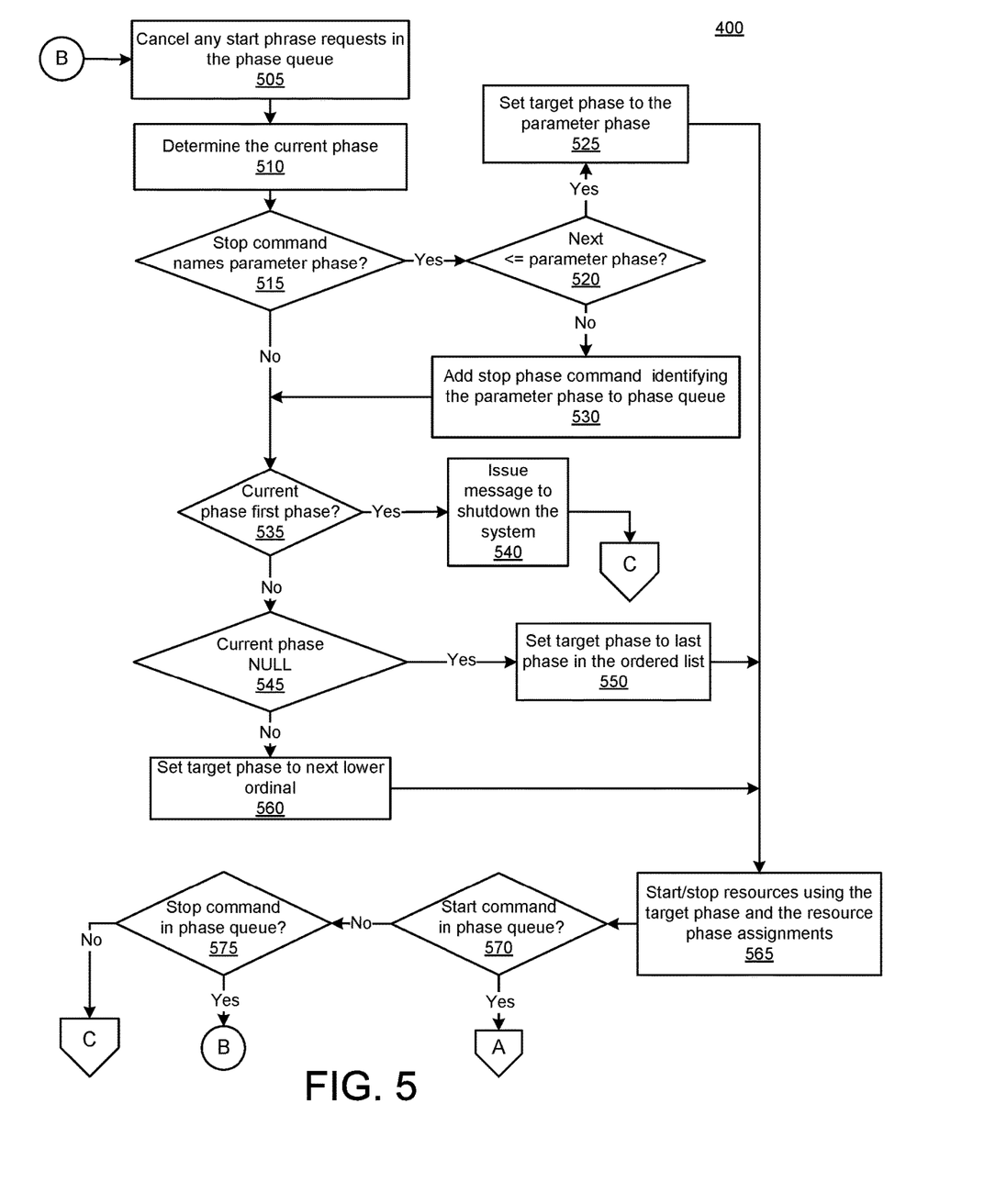
FIG. 5 is a flowchart illustrating an example process for stopping resources using phases, according to an implementation.

FIG. 5 is a flowchart illustrating an example process for stopping resources using phases, according to an implementation. Process 500 stops resources assigned to phases in phase order, one phase at a time, and waiting for an operator command, between phases. Process 500 may execute as part of step 335 of FIG. 3. Process 500 may begin by canceling any start phase requests in the phase queue (505). As discussed with regard to FIG. 4, start phase and stop phase commands queued in a first-come-first-served basis, and a stop phase command received after a series of start phase commands will go ahead of the start commands. Thus, any start phase commands should be cleared out as a stop phase command overrides the start procedure. Similarly, if the operator provides a start command during a stop procedure, the start command overrides any pending stop commands. The system then determines the current phase (510). For example, the system may read the current phase from memory. As another example, the system may determine the current phase based on which resources are active. The system then sets the target phase based on the current phase, the ordered list of phases and the parameter phase, if provided.

The system determines whether the stop phase command includes a parameter phase (515). If a parameter phase is provided (515, Yes), the system determines whether the parameter phase is greater than or equal to the next phase (520). The next phase is the phase that precedes the current phase in the ordered list. In other words, the next phase is the next earlier phase in the ordered list, e.g., the next lower ordinal than the current phase. If the next phase is less than or equal to the parameter phase (520, Yes), the system sets the target phase to the parameter phase (525). If the parameter phase is less than the next phase, the system adds a stop phase command that identifies the parameter phase to the phase queue (530). In other words, the system interprets the stop phase command that names an earlier phase as a stop phase command for each phase that occurs before the current phase up to, but not including, the parameter phase. As the system has not yet stopped the phases that succeed the parameter phase, the system will automatically stop the resources in each phase occurring after the parameter phase in the ordered list, starting from the current phase.

Thus, when the stop command does not identify a parameter phase (515, No), or after adding the stop phase command to the parameter queue (530), the system determines whether the current phase is the first phase, e.g., the first phase in the ordered list (535). If it is, the system may issue a message to the system operator to shut down the system (540). The system may not allow the resources associated with the first phase to be stopped to avoid stopping resources that enable the operator to interact with the phase manager. Process 500 then ends, and the system may wait for another start phase command, or may be shut down.

If the current phase is not the first phase (535, No), the system may determine whether the current phase is the NULL or default phase (545). If the current phase is NULL (545, Yes), the system may set the target phase to the last phase in the ordered list, e.g., to a phase with the highest ordinal. If the current phase is not NULL (545, No), the system may set the target phase to the next phase, or in other words the phase that precedes the current phase in the ordered list (560). In some implementations, this may be the phase assigned the next lowest ordinal number.

Once the target phase is set, based on the current phase, the ordered list of phases, and the parameter phase, if provided, the system attempts to set the state of the resources based on the resource phase assignments, the target phase, and the state manager policy (565). As discussed, each resource may have an active/running state or an inactive/stopped state. In general after step 565, resources assigned to a phase that succeeds the target phase in the ordered phase list should have an inactive state and the remaining resources should have an active state. However, in some cases the state manager resource policy may indicate a resource should be inactive based on the day-of-week and/or the time-of-day. This policy will override the general rule, and a resource in the remaining states may already be inactive. In addition, the state manager policy may identify a resource in an earlier phase as dependent on a resource in a later phase. Should this occur, the resource in the later phase will not be made inactive until the earlier phase. Thus, setting the resource states in accordance with the state manager policy does not always result in states assigned to later phases being inactive. The system sets the resource states in accordance with the state manager policy and subject to system errors. The process of setting resource states is described in more detail with regard to FIG. 6.

Once the system sets the resource states, the system may determine whether the operator has provided a next command by checking the phase queue. If the phase queue includes a start phase command anywhere in the phase queue (570, Yes) the system initiates the start phase process, described in more detail with regard to FIG. 4. The operator may have provided the start phase command while the system was attempting to set the resource states. If the phase queue lacks a start phase command (570, No), the system determines if there is a stop phase command in the phase queue (575). If there is a start phase command (575, Yes), the system repeats process 500 using the next stop phase command in the phase queue, e.g., at step 505. Otherwise (575, No), the system waits for another command from the operator (e.g., step 315 of FIG. 3).

Figure 6:
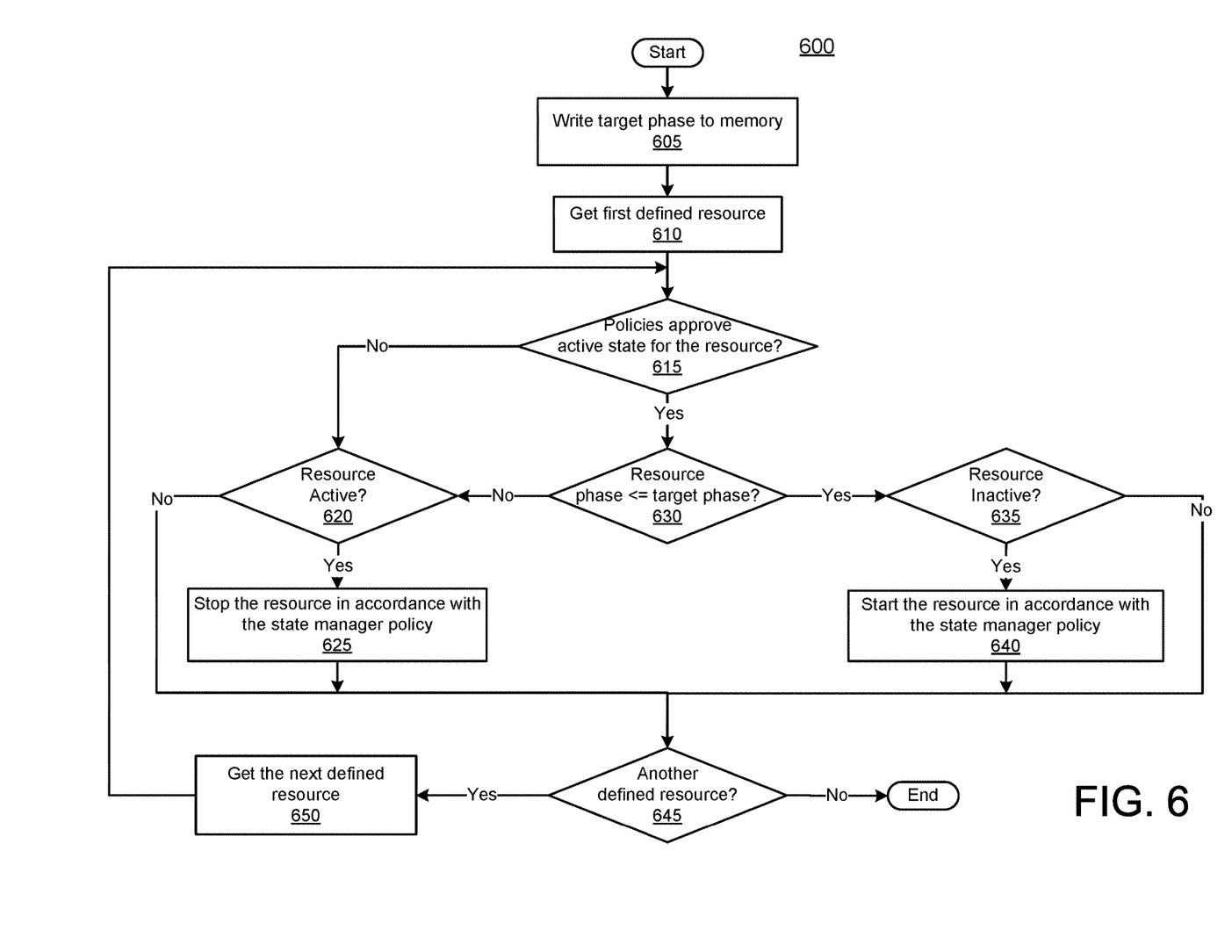
FIG. 6 is a flowchart illustrating an example process for determining a state for each resource using phases, according to an implementation.

FIG. 6 is a flowchart illustrating an example process 600 for determining a state for each resource using phases, according to an implementation. Process 600 may be executed as part of step 565 of FIG. 5 or 470 of FIG. 4. Process 600 may set the state of a resource to either active or inactive, if the resource does not already have the determined state. An active resource is a resource that is running or executing. An inactive resource is not currently running or executing. Activating a resource, or setting the resource to an active state includes starting the resource so that is executes. Inactivating a resource terminates a resource so that it is no longer running. Process 600 checks the status of every resource defined to the state manager policy, not just those resources assigned to the target phase. This ensures that dependencies are eventually met. Process 600 may begin by making the target phase the current phase (605). In some implementations, this may be writing the target phase to a particular memory location. The system may obtain a first defined resource, e.g., a resource defined to the state manager (610).

The system may determine whether the state manager policies approve an active state for the first resource (615). The state manager policies may not allow certain resources to run at specified periods. For example, a PAYROLL resource may only run on weekends. Or a MESSAGES resource may only run weekdays between 8 am and 5 pm. Outside of these timeframes, the resource may not be approved for an active state. If the policy does not approve an active state for the resource (615, No), the system may determine whether the resource is active (620). If the resource is active (620, Yes), the system may stop the resource so that the phase aligns with the policy (625). If the policy does approve an active state for the resource (615, Yes), the system may determine whether the phase that the resource is assigned to is equal to the target phase or occurs earlier in the ordered phase list than the target phase (630). If the resource occurs earlier or is assigned to the target phase (630, Yes), the resource should be active and the system may determine whether the resource is inactive (635). If the resource is inactive (635, Yes), the system may start the resource in accordance with the state manager policy (640). This may include not starting a resource because the policy indicates the resource is dependent on a resource that is not yet active. If the resource phase is not less than the target phase (630, No), the resource should be inactive and the system may determine whether the resource is currently active (620). If the resource is active (620, Yes), the system may stop the resource in accordance with the state manager policy (625). This may include leaving the resource active if another active resource is dependent on the resource.

The system may repeat this process when there are other resources for the state manager policy that have not been processed (645, Yes). The system may work on the next resource (650), repeating steps 615 to 645. Once all resources defined to the state manager, not just the resources assigned to the target phase, have been processed (645, No), process 600 ends. Process 600 may include additional reporting steps not specifically illustrated. For example process 600 may include reporting the number of resources assigned to the target phase, the number of resources active or inactive for the target phase after all resources have been processed, etc.

An example follows using the resource assignment structure 200 of FIG. 2. The system may issue a start command in response to an IPL, which causes the system to start the resources associated with the MINIMAL phase. The MINIMAL phase is the first phase in the ordered list. In some implementations, this phase may be assigned an ordinal number of one (1). The system starts the three resources assigned to the MINIMAL phase in accordance with the state manager policy. In this example, one of the resources may not be approved for active status and may not be started. The system operator may check the status of the three resources and determine that everything is working properly and the operator may issue a start phase command, which causes the DATABASE phase to begin and the three resources associated with the DATABASE phase are started in accordance with the policy. The operator may issue a start CHECKIN phase command, which will cause the system to start the three resources associated with the RESERVATION phase and then to proceed automatically to starting the resources for the CHECKIN phase. The operator may be notified that the system encountered an error with one of the resources in the CHECKIN phase. The operator may decide to issue a stop phase command identifying the DATABASE phase. This may cause the system to inactivate any resource not associated with the MINIMAL and DATABASE phases. The system operator can address the problem and then issue the start phase command for the RESERVATION and CHECKIN phases. At the conclusion of the CHECKIN phase the operator may provide a final start command and the system may start the MESSAGES resource in the NULL phase.

According to one aspect, a mainframe computing system includes at least one processor, a state manager configured to manage a plurality of resources that run on the mainframe computing system, and a phase manager that operates with the state manager to automatically start and stop the plurality of resources in phases according to an ordered list of phases. At least some of the plurality of resources are assigned to one of a plurality of phases in the ordered list of phases.

These and other aspects can include one or more of the following features. For example, the phase manager may be configured to assign an ordinal number to each phase in the ordered list of phases responsive to an initial program load and use the ordinal numbers to start and stop the plurality of resources during each phase. As another example, resources not assigned to a phase in the ordered list of phases may be associated with a NULL phase. As another example, the mainframe computing system further includes a phase queue and the phase manager is configured to read a current phase from memory, determine a target phase based on the current phase, use the target phase and resource phase assignments to start and stop the plurality of resources. In some imple-mentations, the phase manager may be further configured to, responsive to determining that the phase queue has a start phase command, start another phase with the start phase command. In some implementations, the phase manager may be configured to, responsive to determining that the phase queue is empty, wait for operator input before starting another phase.

As another example, the phase manager may be configured to read, responsive to receipt of an operator start phase command, a current phase from memory, determine that the start phase command includes a parameter phase, set a target phase to the parameter phase responsive to determining the parameter phase is less than or equal to a next phase, the next phase succeeding the current phase in the ordered list of phases, and use the target phase and resource phase assignments to start and stop the plurality of resources. As another example, the phase manager may be configured to read a current phase from memory, responsive to receipt of an operator start phase command, determine that the start phase command includes a parameter phase, add the phase start command to a phase queue responsive to determining the parameter phase is greater than a next phase, the next phase succeeding the current phase in the ordered list of phases, set a target phase to the next phase, and use the target phase and resource phase assignments to start and stop the plurality of resources. As another example, the phase manager may be configured to read a current phase from memory, responsive to receipt of an operator stop phase command, determine that the stop phase command includes a parameter phase, set a target phase to the parameter phase responsive to determining the parameter phase is greater than or equal to a previous phase, the previous phase appearing before the current phase in the ordered list of phases, and use the target phase and resource phase assignments to start and stop the plurality of resources.

In one aspect, a method for starting and stopping mainframe resources in phases includes determining a current phase of an ordered list of phases, the current phase being one of a plurality of phases in the ordered list of phases, setting a target phase based on the current phase, the ordered list of phases, and a parameter phase when the parameter phase is provided, and using the target phase and a resource assignment structure to start and stop a plurality of resources that run on a mainframe computing system, at least some of the plurality of resources having an assigned phase in the resource assignment structure. The method includes repeating the determining, setting, and using, responsive to receiving a phase command.

These and other aspects can include one or more of the following features, alone or in combination. For example, setting the target phase can include determining that the parameter phase is provided, determining whether the parameter phase is less than or equal to a next phase, the next phase succeeding the current phase in the ordered list of phases, setting the target phase to the parameter phase responsive to determining the parameter phase is less than or equal to the next phase, and responsive to determining the parameter phase is less than or equal to the next phase, adding a start phase command identifying the parameter phase to a phase queue and setting the target phase to the next phase. In some implementations, the method may also include determining, after writing the target phase to memory as the current phase, that the phase queue is not empty and accepting the phase command in the phase queue as the received phase command.

As another example, setting the target phase can include determining that a parameter phase is not provided, determining that the current phase is not a NULL phase, and setting the target phase to a next phase in the ordered list, the next phase succeeding the current phase in the ordered list of phases. As another example, for each of the plurality of resources, using the target phase and the resource assignment structure to start and stop the plurality of resources can include determining, using the resource assignment structure, a phase assigned to the resource, determining whether the phase assigned to the resource is greater than the target phase, responsive to determining that the phase assigned to the resource is greater than the target phase, stopping the resource responsive to determining that the resource is currently active, and responsive to determining that the phase assigned to the resource is not greater than the target phase, starting the resource responsive to determining that the resource is currently not active. As another example, resources in the plurality of resources not assigned to a phase in the resource assignment structure are assigned to a NULL phase, which is a default phase that is considered the last phase of the ordered list of phases.

In one aspect, a method includes receiving, at a mainframe computing system, an initial program load command and starting a state manager responsive to the initial program load command. The state manager manages a plurality of resources running on the mainframe computing system. The method also includes setting a target phase to a first phase identified in an ordered list of phases and starting resources assigned to the target phase in a resource phase assignment structure in accordance with a policy for the state manager. The resource phase assignment structure identifies at least some of the plurality of resources. The method also includes waiting for a phase command before starting resources not assigned to the target phase.

These and other aspects can include one or more of the following features, alone or in combination. For example, the method may also include receiving a start phase command that identifies a parameter phase, the parameter phase being a penultimate phase in the ordered list of phases, adding the start phase command to a phase queue, setting the target phase to a next phase in the ordered list of phases, the next phase being subsequent to the first phase, starting resources assigned to the target phase and to phases occurring earlier in the ordered list than the target phase in accordance with a policy for the state manager, reading the start phase command from the phase queue, and starting a next phase based on the start phase command, wherein the start phase command in the phase queue is processed as a phase command. In some implementations, the method may also include receiving, during the processing of the next phase, a stop phase command identifying a second parameter phase, placing the stop phase command in the phase queue. reading the stop phase command from the phase queue after the next phase, removing any remaining start phase commands from the phase queue, determining that the second parameter phase occurs earlier in the ordered list than the next phase; and stopping resources assigned to phases occurring later in the ordered list than the second parameter phase in accordance with a policy for the state manager.

As another example, at least one of the resources assigned to the target phase has a dependency in the state manager policy on a resource assigned to a first phase occurring later in the ordered list than the target phase, wherein the at least one of the resources is not started until the target phase is equal to the first phase. As another example, at least one of the resources assigned to a phase occurring later in the ordered list than the target phase is upgraded during the waiting. As another example, the method may also include receiving a start phase command during the starting, adding the start phase command to a phase queue, and using the start phase command in the phase queue as the phase command.

In one aspect, a method includes receiving, at a mainframe computing system, an initial program load command and starting a state manager responsive to the initial program load command. The state manager manages a plurality of resources running on the mainframe computing system. The method may also include determining an assignment of the plurality of resources to phases in an ordered list of phases, starting the plurality resources by phase in the phase order, wherein each phase starts responsive to a phase start command, receiving a stop phase command identifying a parameter phase, and stopping resources assigned to phases occurring later in the ordered list.

In one aspect, a method includes determining, responsive to receipt of an operator start phase command, a current phase and determining that the start phase command includes a parameter phase. The method also includes setting a target phase to the parameter phase responsive to determining the parameter phase is less than or equal to a next phase, the next phase succeeding the current phase in an ordered list of phases. The method also includes using the target phase and resource phase assignments to start and stop a plurality of resources managed by a state manager policy.

In one aspect a system includes at least one processor and memory storing instructions that, when executed by the at least one processor, cause the computing system to perform any of the methods and/or processes disclosed herein.

In one aspect, a computer readable medium stores computer readable instructions, which when executed, cause a computing system to carry out any of the methods and/or processes disclosed herein.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps are not limited to the order illustrated by example processes herein.

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A mainframe computing system comprising:
   at least one processor;
   a state manager configured to manage a plurality of resources that run on the mainframe computing system and that are identified in a state manager policy; and
   a phase manager that operates with the state manager to:
   determine phase assignments for the plurality of resources, wherein a least some of the plurality of resources are assigned only to a single phase,
   determine a current phase,
   determine a target phase,
   automatically start and stop the plurality of resources so that approved resources assigned to the target phase and to phases occurring earlier than the target phase in an ordered list of phases are running, and remaining resources in the ordered list of phases are stopped, and
   wait for a phase command between phases.

2. The mainframe computing system of claim 1, wherein the phase manager is configured to:
   assign an ordinal number to each phase in the ordered list of phases responsive to an initial program load; and
   use the ordinal numbers to determine the order of phases in the ordered list of phases.

3. The mainframe computing system of claim 1, wherein resources not assigned to a phase in the ordered list of phases are associated with a NULL phase.

4. The mainframe computing system of claim 1, further comprising:
   a phase queue,
   wherein the phase manager is further configured to:
   obtain a phase command from the phase queue, wherein the phase queue receives phase commands from an operator or as part of determining the target phase.

5. The mainframe computing system of claim 1, wherein a resource is approved when the state manager policy lacks a satisfied condition that prohibits the resource from running.

6. The mainframe computing system of claim 1, wherein the phase manager is configured to:
   read the current phase from memory, responsive to receipt of a start phase command received from an operator;
   determine that the start phase command includes a parameter phase; and
   set the target phase to the parameter phase responsive to determining the parameter phase is less than or equal to a next phase, the next phase succeeding the current phase in the ordered list of phases.

7. The mainframe computing system of claim 1, wherein the phase manager is configured to:
   read the current phase from memory, responsive to receipt of a start phase command received from an operator;
   determine that the start phase command includes a parameter phase;
   add the start phase command to a phase queue responsive to determining the parameter phase is greater than a next phase, the next phase succeeding the current phase in the ordered list of phases; and
   set the target phase to the next phase.

8. The mainframe computing system of claim 1, wherein the phase manager is configured to:
   read the current phase from memory, responsive to receipt of a stop phase command received from an operator;
   determine that the stop phase command includes a parameter phase; and
   set the target phase to the parameter phase responsive to determining the parameter phase is greater than or equal to a previous phase, the previous phase appearing before the current phase in the ordered list of phases.

9. A method for starting and stopping mainframe resources in phases comprising:

receiving a phase command via a phase queue, the phase queue holding phase commands issued by an operator but not yet processed;

responsive to receiving the phase command, determining a current phase of an ordered list of phases, the current phase being one of a plurality of phases in the ordered list of phases;

setting a target phase based on the current phase, the ordered list of phases, and a parameter phase when the parameter phase is provided;

using the target phase and a resource assignment structure to start and stop a plurality of resources that run on a mainframe computing system so that approved resources assigned to the target phase and to phases occurring earlier than the target phase in the ordered list of phases are running, and remaining resources in the ordered list of phases are stopped, at least some of the plurality of resources being assigned to only a single phase in the resource assignment structure; and waiting for a next phase command between phases.

10. The method of claim 9, wherein setting the target phase includes:

determining whether the parameter phase is less than or equal to a next phase, the next phase succeeding the current phase in the ordered list of phases;

setting the target phase to the parameter phase responsive to determining the parameter phase is less than or equal to the next phase; and responsive to determining the parameter phase is greater than the next phase:
adding a start phase command identifying the parameter phase to the phase queue, and
setting the target phase to the next phase.

11. The method of claim 10, wherein waiting for a phase command between phases includes:

determining, after writing the target phase to memory as the current phase, that the phase queue is not empty; and accepting the phase command in the phase queue as the next phase command.

12. The method of claim 9, wherein setting the target phase further includes:

determining that a parameter phase is not provided with the phase command, the phase command being a start phase command;

determining that the current phase is not a NULL phase; and setting the target phase to a next phase in the ordered list of phases, the next phase succeeding the current phase in the ordered list of phases.

13. The method of claim 9, wherein a resource is approved when a state manager policy lacks a satisfied condition for the resource that prohibits running, the condition relating to a date condition or a time condition.

14. The method of claim 9, wherein resources in the plurality of resources not assigned to a phase in the resource assignment structure are assigned to a NULL phase, which is a default phase that is considered the last phase of the ordered list of phases.

15. A method comprising:

receiving, at a mainframe computing system, a start phase command that includes a parameter phase;

managing a plurality of resources to the parameter phase using a resource phase assignment structure in accordance with a policy for a state manager, so that approved resources assigned to the parameter phase and to phases occurring earlier than the parameter phase in an ordered list of phases are running, and remaining resources in the ordered list of phases are stopped, the resource phase assignment structure identifying at least some of the plurality of resources; and waiting for an operator command before starting resources not assigned to the parameter phase and not assigned to the phases occurring earlier than the parameter phase in the ordered list of phases.

16. The method of claim 15, wherein the parameter phase is a first parameter phase, the method further comprising:

receiving a start phase command that identifies a second parameter phase, the second parameter phase being a penultimate phase in the ordered list of phases;

adding the start phase command to a phase queue;

setting a target phase to a next phase in the ordered list of phases, the next phase being subsequent to the first parameter phase;

starting resources assigned to the target phase and to phases occurring earlier in the ordered list of phases than the target phase in accordance with the policy for the state manager;

reading the start phase command from the phase queue; and starting a next phase based on the start phase command, wherein the start phase command in the phase queue is processed as an operator command.

17. The method of claim 16, further comprising:

receiving, during the processing of the next phase, a stop phase command identifying a third parameter phase;

placing the stop phase command in the phase queue;

reading the stop phase command from the phase queue after the next phase;

removing any remaining start phase commands from the phase queue;

determining that the third parameter phase occurs earlier in the ordered list of phases than the next phase; and stopping resources assigned to phases occurring later in the ordered list of phases than the third parameter phase in accordance with the policy for the state manager.

18. The method of claim 15, wherein at least one of the resources assigned to the parameter phase has, in the policy for the state manager, a dependency on a resource assigned to a first phase occurring later in the ordered list of phases than the parameter phase, wherein the at least one of the resources is not started until the first phase is started.

19. The method of claim 15, wherein at least one of the resources assigned to a phase occurring later in the ordered list of phases than the parameter phase is upgraded during the waiting.

20. The method of claim 15, further comprising:

receiving a start phase command while managing the plurality of resources to the parameter phase; and adding the start phase command to a phase queue, wherein the start phase command in the phase queue is used as the operator command.

21. The mainframe computing system of claim 1, wherein the phase manager receives assignment of a resource to a phase and an ordering of the phases from a system operator.

* * * * *